Aug. 24, 1943.    G. J. ESSELEN    2,327,627
METHOD OF FORMING POLYVINYL ACETAL RESIN SHEETS
Filed March 3, 1938
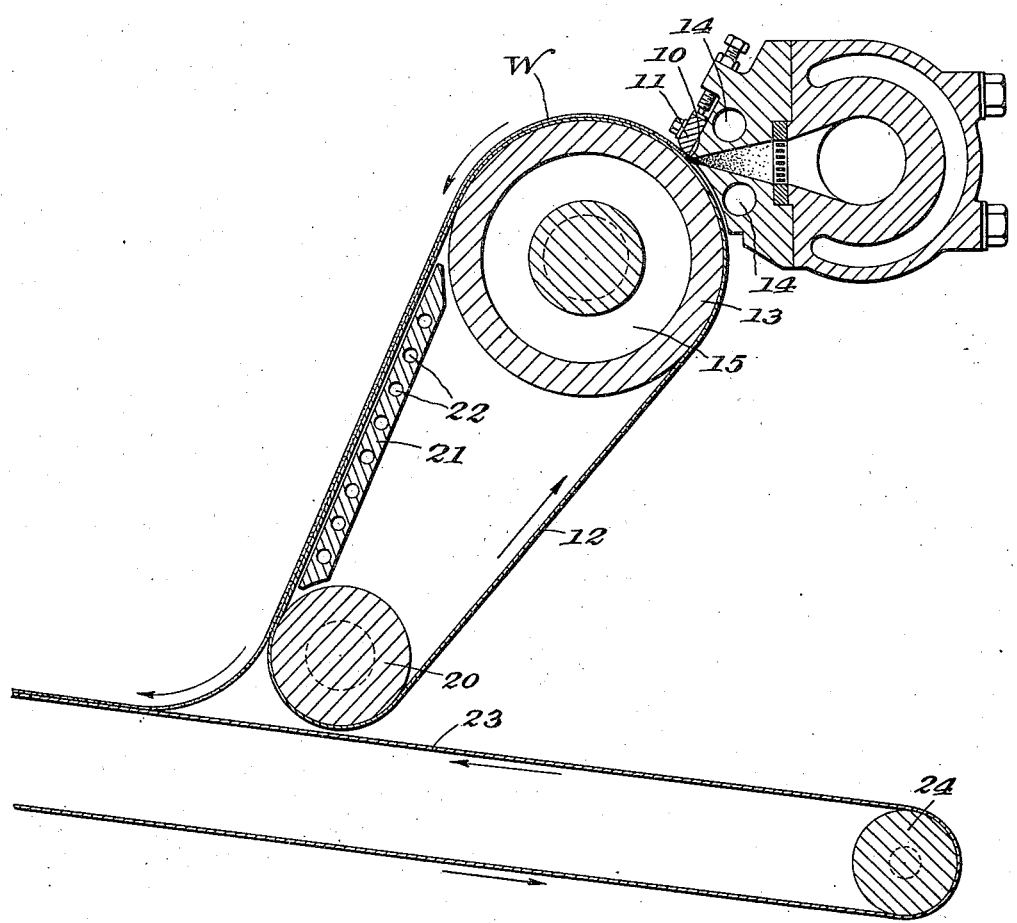
Inventor:
Gustavus J. Esselen
By Dike, Calver and Gray
Attorneys.

Patented Aug. 24, 1943

2,327,627

UNITED STATES PATENT OFFICE 2,327,627

METHOD OF FORMING POLYVINYL ACETAL RESIN SHEETS

Gustavus J. Esselen, Swampscott, Mass., assignor, by mesne assignments, to Monsanto Chemical Company, a corporation of Delaware Application March 3, 1938, Serial No. 193,717

6 Claims. (Cl. 18—57)

My present invention relates to the formation of certain materials into a continuous sheet or web from which pieces may be cut for use in the arts and particularly in the manufacture of laminated glass, such as is employed in motor vehicles. While the present invention is the result of the attempts to form rubbery tacky plasticized polyvinyl acetal resins into a continuous web or sheet and this is the material primarily contemplated I do not limit myself to the use of my improved invention on this particular material as my improved process is applicable to other materials which present similar difficulties.

Examples of polyvinyl acetal resins are described in the patent to Morrison, Skirrow & Blaikie, Reissue No. 20,430, dated June 29, 1937. To give to this material the qualities which are desirable, if it is to be used as an interleaf for laminated glass, certain compatible plasticizers, for instance, dibutyl, diethyl and dimethyl phthalate, di-ethylene-glycol-dipropionate etc., must be mixed with it.

At the time polyvinyl acetal resin became commercially available, attempts were made to form the plasticized resin into sheets or webs using the procedure then considered best for the formation of other resins, cellulose esters and plastic materials into sheets, namely, colloiding with plasticizer and volatile solvent, extruding in sheet form and drying to remove the solvent.

This procedure was unsatisfactory because, (1) the solvent clung so tenaciously to the web that it could not be removed within any reasonable and feasible time limit, (2) the tendency for bubble formation was too great, (3) the web stuck so tenaciously to the apparatus that it was most difficult to handle, and (4) the unusual properties of the material prevented obtaining reasonable uniformity of gauge.

The problem of obtaining satisfactory uniformity of gauge has been one of the most serious difficulties in the fabrication of the plasticized polyvinyl acetal resin particularly as the users of this material in the manufacture of laminated glass find that sheets of this material must have a more accurate gauge than either cellulose acetate or nitrate plastic since otherwise difficulties in lamination are encountered. The thickness of plasticized polyvinyl acetal stock used in the manufacture of laminated glass is ordinarily 0.015 of an inch and the total tolerance permitted is not more than 0.001 of an inch and the gauge must not vary more than 0.0005 in any 0.5 inch of length or width. The plasticized acetal resin under discussion is very rubbery and after being stretched returns very slowly to its original dimensions. It is also extremely tacky and adheres tenaciously to any support with which it contacts. The pull necessary to loosen it elongates the sheet, reduces its thickness or width or both and sets up within the sheet internal stresses which persist for a long time and may be released during subsequent manipulation of the sheets. The release of these internal stresses manifests itself in variations of gauge, warping and shrinkage which seriously diminish the utility of sheets made from the material. Furthermore, if the attempt is made to produce the sheet by any process which involves handling the tacky material over rolls or other supports, particularly if the web is dragged over a number of such supports, the consequent injury to the material manifests itself not as a uniform diminution of gauge but as variations in gauge which are irregularly distributed over the entire length and breadth of the web produced.

These difficulties have been overcome in part (1) by mixing the polyvinyl acetal resin with compatible plasticizers but without volatile solvent liquids as described in the co-pending application of Gustavus J. Esselen and Elmer R. Derby, Serial No. 79,717, filed May 14, 1936, and (2) by extruding the plastic through a straight slot die, one lip of which is formed by the surface of a roll, as described in the co-pending application of Elmer R. Derby and Frederic A. Parkhurst, Serial No. 142,352, filed August 30, 1937.

An attempt has also been made to remove the internal strains produced during the manufacture of the material by subsequently subjecting the previously formed web to heat while supporting it as freely from strain as possible. However, since the process of manufacture is necessarily a rapid continuous one it is not possible to carry out the heating under conditions such that the web is entirely free from stresses, and the results have not been satisfactory.

My present invention contemplates an improved method of forming a web of plastic material, such as plasticized polyvinyl acetal resin, whereby great accuracy in gauge may be obtained and the completed sheet has practically no troublesome internal stresses which affect its usefulness.

In accordance with the invention plastic material is heated to a temperature at which it is substantially fluid and is formed into a web by an extrusion die and simultaneously deposited on a heated travelling surface. The travelling surface at the point where the soft heated stock is deposited upon it, and for some distance from this point, is maintained at a temperature substantially equal to or slightly above that of the stock so that no chilling takes place as the stock is deposited and hence internal stresses which would otherwise be set up in the stock are avoided. At some distance from the point where the fluid stock is deposited on the travelling surface, the stock is chilled to a low temperature sufficient to render the sheet of stock hard and tough and to reduce its tendency to stick to the travelling surface to a minimum so that it can be removed from the travelling surface without being pulled or strained severely.

The invention will be more clearly understood from the following description in conjunction with the accompanying drawing in which the single figure is a diagrammatic view of an apparatus for use in the practice of the invention.

The apparatus illustrated in the accompanying drawing is not a part of my invention but is similar to that described in the co-pending application to Frederic A. Parkhurst, Serial No. 193,705, filed March 3, 1938, and comprises an extrusion die having an orifice 10 one lip of which is formed by an adjustable plate 11. The stock passes directly onto the surface of an endless metal belt 12 which itself passes over a roll 13 positively driven to rotate in the direction of the arrow. This metal belt forms a travelling surface. For the manufacture of polished stock the belt and the die lip are highly polished, although for other purposes the travelling surface may be given a matte finish, or a design may be applied to it. Suitable passages 14 are provided adjacent the orifice 10 through which heating medium can be circulated to heat the plastic material. A chamber 15 is provided in the roll 13 for circulation of heating medium to heat the roll 13 and the engaging portion of the belt 12. The roll 13 is positioned so that the surface of the belt 12 is spaced from the edge of the plate 11 a distance corresponding to the desired thickness of the web to be formed. The belt 12 passes over an idler roll 20 which is resiliently mounted to move toward and away from the roll 13 in response to expansion and contraction of the belt 12 due to temperature changes. A cooling plate 21 is positioned between the rolls 13 and 20 and adjacent the inner surface of the belt 12 at the point where the latter leaves the roll 13. The plate 21 is provided with suitable passages 22 through which a cooling medium may be circulated. Any satisfactory method of cooling or chilling the stock may be employed, but it should be effective to cool it enough to reduce its tendency to adhere to the travelling surface or belt and permit its removal with a minimum of strain or bending. It will be noted that the web travels a considerable distance from the orifice 10 along the surface of the belt 12, while the belt is still in contact with the heated roll 13 and before the belt 12 passes over the front end of the cooling plate 21. This affords ample opportunity for the elimination of any possible internal stresses, before the material is hardened by being cooled as it passes over the cooling plate 21. A second belt 23 passes over a roll 24 and past the roll 20 and is arranged to move in the direction of the arrow so as to remove the web of plastic material from the belt 12. These two belts have the same surface speed so that the web is strained as little as possible by its removal from the belt 12 which forms the travelling surface on which the web is deposited by the extension die.

It will be understood that I do not limit myself to the use of the particular apparatus herein described for the practice of my novel method.

I claim:

1. The method of producing a continuous web of polyvinyl acetal resin and of relieveing forming stresses therein, which comprises rendering the material substantially fluid by heat, extruding progressively the substantially fluid material upon a travelling unconfined surface, to form a web, heating the formed web while in contact with the travelling surface, subsequently cooling the web and thereafter removing the web from the surface.

2. The method of producing a continuous web of thermoplastic materials of uniform thickness and of relieving forming stresses therein, which comprises rendering the material substantially fluid by heat, extruding progressively the substantially fluid material upon an unconfined surface, to form a web, maintaining contact of the formed web with said surface while keeping the temperature of the web substantially that of the fluid material, and subsequently cooling the web and thereafter removing said web from the surface.

3. The method of producing a continuous web of polyvinyl acetal resin containing a plasticizer and of relieveing stresses therein which comprises rendering the material substantially fluid by heat, continuously extruding the substantially fluid material upon a travelling unconfined surface to form a web, maintaining contact of the formed web with said travelling surface while keeping the temperature of the web substantially that of the fluid material, then cooling the web while still upon the travelling surface and then removing the hardened web from the cooled surface.

4. The method of making a continuous web of plasticized polyvinyl acetal resin which comprises moving a continuous travelling unconfined surface progressively through hot and cold regions, continuously depositing on the hot region of said surface a layer of said resin heated to substantially fluid condition in the substantial absence of volatile solvent to form an unconfined web, heating the formed web while in contact with said travelling unconfined surface, chilling the web while it is supported by the travelling unconfined surface and removing the web from the surface while it is in the said cool region.

5. The method of making a continuous web of plasticized polyvinyl acetal resin which comprises moving a continuous travelling unconfined surface successively through hot and cold regions continuously, depositing upon said surface in said hot region a layer of said resin heated to substantially fluid condition in the substantial absence of volatile solvent to form a web, heating the formed web while in contact with said travelling unconfined surface, and removing said web from said surface after it has reached said cool region.

6. The method of making a continuous web of plasticized polyvinyl acetal resin which consists in rendering it fluid by heat, depositing it while fluid on a heated portion of a traveling unconfined surface to avoid internal stresses, heating the formed web while in contact with said travelling unconfined surface, cooling the travelling unconfined surface and the web thereon, and continuously removing the web from the travelling surface in the substantial absence of strain.

GUSTAVUS J. ESSELEN.